United States Patent [19]

Mehan et al.

[11] Patent Number: 4,876,116

[45] Date of Patent: Oct. 24, 1989

[54] METAL CONDUCTORS WITH IMPROVED SOLDERABILITY

[75] Inventors: Ashok K. Mehan, Union City; Hans E. Lunk, Menlo Park, both of Calif.

[73] Assignee: Raychem Corporation, Menlo Park, Calif.

[21] Appl. No.: 906,355

[22] Filed: Sep. 11, 1986

[51] Int. Cl.$^4$ .............................................. B05D 5/12
[52] U.S. Cl. ................................. 427/118; 156/187; 427/388.1; 427/388.2
[58] Field of Search ................... 427/118, 120, 388.1, 427/388.2; 156/187

[56] References Cited

U.S. PATENT DOCUMENTS

| | | | |
|---|---|---|---|
| 3,725,230 | 4/1973 | Bahder et al. | 427/118 X |
| 3,775,175 | 11/1973 | Merian | 427/118 X |
| 3,873,458 | 3/1975 | Parkinson | 427/388.2 X |
| 4,091,123 | 5/1978 | Ayusawa et al. | 427/388.2 X |
| 4,184,001 | 1/1980 | Hildreth | 427/118 X |
| 4,348,460 | 9/1982 | Saunders et al. | 427/118 X |

FOREIGN PATENT DOCUMENTS

A8300415 6/1982 PCT Int'l Appl. .
1177306 1/1970 United Kingdom .

OTHER PUBLICATIONS

Military Standard 202F, Method 208D (Apr. 1, 1980).
Beecher, "Emulsions: Theory and Practice", pp. 232-255, (Krieger 1966).
Ciba-Geigy, Trade Pamphlet Entitled "Sarkosyl".
Chemical Abstracts 102508s, vol. 74 (5-1971).
Chemical Abstracts 76357j, vol. 88 (3-1978).

*Primary Examiner*—Thurman K. Page
*Attorney, Agent, or Firm*—Timothy H. P. Richardson; Herbert G. Burkard

[57] ABSTRACT

When metal conductors are stored, especially in humid environments, their solderability decreases. The rate at which solderability decreases can be reduced by treating the conductor with a suitable surface active agent, particularly one which has an HLB (hydrophile-lipophile balance) number of less than 10, preferably less than 5. The surface active agent can be applied to the conductor with a suitable liquid carrier, e.g. as a solution in a mineral oil or a halogenated hydrocarbon. If desired, a polymeric insulating jacket can be melt-extruded or wrapped over the treated conductor.

17 Claims, No Drawings

METAL CONDUCTORS WITH IMPROVED SOLDERABILITY

BACKGROUND OF THE INVENTION

1. Field of the Invention

This invention relates to metal conductors having improved retention of solderability on storage.

2. Introduction to the Invention

When metal conductors are stored, especially in humid environments, their solderability decreases. This causes the most serious problems in the electrical and electronics industries, and much effort has been devoted to finding solutions to those problems. Reference may be made for example to the Naval Weapons Center Technical Publication 6707 (NWC TP 6707), which is a collection of the papers presented at the Tenth Annual Soldering/Manufacturing Seminar in February, 1986, and the disclosure of which is incorporated herein by reference. A quantitative measure of the rate at which the solderability of a metal conductor decreases can be obtained through the test defined in Military Standard 202F, Method 208D (Apr. 1, 1980) and its successors, referred to herein as MS 202F-208, the disclosures of which are incorporated herein by reference. In this test, the conductor is subjected to steam-aging for a specified time (thus simulating aging for a much longer time under normal storage conditions). The aged specimen is then dipped successively in a flux and in a solder under specified conditions, and the percentage of the dipped conductor which is covered by a continuous new solder coating is measured. According to Method 208D, the conductor, in order to pass the test, must be at least 95% covered after steam aging for 1 hour. However, it has been found that in many cases conductors which pass the test under these conditions are nonetheless unsatisfactory in solderability after storage under normal conditions. Consequently it has recently been proposed that that the duration of the steam-aging step should be increased to 8 hours, or even to 16 or 24 hours, in order to ensure satisfactory solderability. It has been suggested that tin-coated copper stranded wires will have improved retention of solderability if the tin-coating is at least 40 microinches thick, i.e. well above the usual thickness of 20-25 microinches. But it is difficult to ensure that there is a uniform thickness of tin on each strand of the wire, and while the thicker coating may help, it does not reliably enable the wire to pass MS 202F-208 at 8 hours of steam-aging.

SUMMARY OF THE INVENTION

We have found that metal conductors have improved retention of solderability on storage if they have a coating thereon of a suitable surface active agent, preferably one which has a hydrophile-lipophile balance number (HLB number) of less than 10, particularly less than 5, especially less than 3. The amount of surface active agent required is small, and the surface active agent can conveniently be applied to the conductor as a solution in a suitable liquid carrier. The liquid carrier can be one which evaporates or one which remains on the surface of the conductor with the surface active agent. A polymeric insulating coating can be applied, e.g. by melt-extrusion or by wrapping, to the coated conductor. We have found that in preferred embodiments of the invention, it is possible to prepare conductors which will reliably pass MS 202F-208 after 8 hours, and even after 16 hours, of steam-aging.

DETAILED DESCRIPTION OF THE INVENTION

The present invention is useful for all solderable metal conductors whose solderability decreases on storage. Suitable conductors include, but are not limited to, wires (stranded or solid), which may be insulated, and which may be in the form of a continuous conductor stored on a reel; braids; leads of electronic components; printed wire assemblies (or printed circuit boards); and contacts of leadless chip components. The conductor can be composed of a single material, e.g. copper or a copper alloy, but usually comprises a core of one material, e.g. copper, a copper alloy or steel, with one or more coatings thereon (which may be electroplated, as is generally preferred, or otherwise applied) of another metal, e.g. copper, a copper alloy, nickel, silver, gold, tin or tin-lead (or another solder). The thickness of such coating at the time the surface-active agent is applied may have an effect on the absolute level of solderability of the treated conductor and/or the rate at which solderability of the treated conductor decreases. We have obtained excellent results by application of a suitable surface active agent to a tin-coated copper stranded wire in which the tin coating has a nominal thickness of 35 to 45 microinches e.g. about 40 microinches. However, the present invention is also very valuable when the thickness of the tin (or other) coating is less, for example 15 to 30 microinches, especially when the surface active agent is applied before the surface of the conductor has had a chance to deteriorate. In this connection it should be remembered that the longer the conductor has been in storage prior to its treatment with the surface active agent, the less likely it is that it will have good solderability. The invention gives particularly good results with tin-coated copper substrates, especially tin-coated copper solid or stranded wires, e.g. of 10 to 26 AWG.

Especially when the conductor is a continuous length of wire, it will often be desirable to form an insulating polymeric coating on the wire after the surface-active agent has been applied thereto. Such insulating coating can be formed by melt-extrusion (e.g. of polyethylene or an ethylene/tetrafluoroethylene copolymer), by tape-wrapping (e.g. of a polyimide tape), or otherwise. The insulated wire can then be stored on a reel until it is needed.

Surface active agents of many kinds are of course well known, and those skilled in the art will have no difficulty, having regard to their own knowledge and the disclosure herein, in determining by routine experimentation whether a particular surface active agent (or mixture of surface active agents, since two or more surface active agents can be used in combination) produces the desired result. One well-known method of classifying surface active agents is by reference to their hydrophile-lipophile balance, which is a measure of the ratio of hydrophilic groups (e.g. hydroxyl or amide groups) to oleophilic groups (e.g. fatty acid ester groups). Reference may be made for example to Pages 232 to 255 of Emulsions: Theory and Practice, by Paul Becher, published by Robert E. Krieger Publishing Co. (1966), the disclosure of which is incorporated herein by reference. We have found that in general, the lower the HLB number of the surface active agent, the more effective it is in producing the desired result (the lower the HLB number of a surface active agent, the more difficult it is to disperse in water). Thus the surface active agents used in this invention preferably have an HLB Number of less than 10, particularly less than 5, especially less than 3. We believe that if the HLB number become too low, the surface-active agent may become less effective, and that the HLB number is, therefore, preferably at least 0.5, e.g. at least 1.0. Surface-active agents which have an HLB number less than 10 and which are readily available include the following (the numbers given in parenthesis are HLB numbers): metal salts of neodecanoic acid, e.g. zinc neodecanoate as sold by Mooney Chemicals (<2); N-acyl sarcosine derivatives, as sold by Ciba Geigy, e.g. oleoyl sarcosine (<2); sorbitan trioleate (1.8); polyoxyethylene sorbitol beeswax derivatives (2-9); sorbitan tristearate (2.1); polyoxyethylene sorbitol hexastearate (2.6); ethylene glycol fatty acid ester (2.7); propylene glycol fatty acid esters (2.4-4.5); ethylene glycol fatty acid esters (3.6); propylene glycol fatty acid esters (3.7-4.1); sorbitan sesquioleate (3.7); polyoxyethylene sorbitol 4.5 oleate (3.7); glycerol monostearate (3.8); sorbitan monooleate (4.3); propylene glycol monolaurate (4.5); sorbitan monostearate (4.7); diethylene glycol monooleate (4.7); diethylene glycol fatty acid esters (4.7-6.1); diethylene glycol monostearate (4.7); diethylene glycol fatty acid esters (4.7); diethylene glycol fatty acid esters (5.1); glycerol monostearate (self-emulsifying) (5.5); diethylene glycol monolaurate (soap free) (6.1-6.5); sorbitan monopalmitate (6.7); polyoxyethylene dioleate (7.5); tetraethylene glycol monostearate (7.7); tetraethylene glycol monooleate (7.7); tetraethylene glycol monooleate (7.7); polyoxypropylene mannitol dioleate (8); polyoxyethylene sorbitol lanolin oleate derivative (8); polyoxypropylene stearate (8), sorbitan monolaurate (8.6); polyoxyethylene fatty acid (9); polyoxyethylene oxypropylene oleate (9); tetraethylene glycol monolaurate (9.4); polyoxyethylene lauryl ether (9.5); polyoxyethylene sorbitan monostearate (9.6); and hexaethylene glycol monostearate (9.6).

Suitable surface active agents are also present in a number of compositions which are sold commercially as penetrating oils and rust inhibitors. For example we have obtained substantial improvements in retention of solderability by applying to a conductor the product sold by the WD40 Company under the trade name WD-40.

The surface-active agent can be applied to the conductor in any convenient way, for example in association with a suitable carrier, i.e. a carrier which will allow the surface active agent to contact the conductor, preferably so as to form a continuous coating thereon. Preferably the surface-active agent is applied as a solution in a hydrophobic liquid carrier. Suitable carriers include liquids which do not evaporate, e.g. mineral oils and mixtures of mineral oils and mineral spirits, and liquids which evaporate rapidly without leaving a residue, e.g. the Freons and other halogenated solvents. The amount of surface active agent needed to produce the desired effect is small, and the concentration of the surface active agent in the carrier can also be small, e.g. 2 to 10% by weight based on the weight of carrier and surface active agent. The conductor can for example be dipped into or passed through a bath of a liquid having the surface active agent dissolved therein, and then wiped to remove excess liquid. In this way a coating comprising the surface-active agent is applied to the conductor. The coating can be very thin, for example less than 0.0005 inch, or less than 0.0002 inch, often less than 10 microns, and can consist essentially of the surface-active agent or a mixture of the surface active agent and a material which served as the carrier for the surface active agent (or the residue of such a material). However, the coating can if desired comprise one or more other ingredients providing that they do not prevent a useful improvement in retention of solderability, and do not result in undesirable properties. The coating is preferably one which is decomposed or otherwise removed by flux or by molten solder in a soldering process.

The conductors of the present invention can be soldered to each other or to other conductors in any convenient way, including wave soldering techniques. The present invention allows conductors to be stored for an extended time, e.g. at least 6 months under normal conditions and often much longer, e.g. at least 12 months, prior to soldering to other conductors, without worry about unacceptable decreases in solderability during such storage.

The invention is illustrated by the following Examples, which are summarized in the Table below. In each Example the conductor was a stranded tin-coated copper wire (19/34, 22 AWG), the tin-coating being an electroplated coating having a nominal thickness of 40 microinches.

In Example 1, a short length of the conductor was tested by MS 202F-208 without any prior treatment.

In Examples 2-15, a short length of the conductor was dipped into a bath which contained either a halogenated solvent (Freon 113, which is trichlorotrifluoroethane or a mineral oil solvent (a mixture of 75% by weight of a mineral oil sold by Union Oil Co. under the trade name Union 150 Neutral and 25% by weight of petroleum distillate sold by Shell Oil Co. under the trade name Stoddard Solvent). In Examples 4 to 15, the solvent contained 5% by weight of a surface active agent, as specified in the Table, which also gives the HLB number of the surface active agent. After the excess solvent had been wiped off, the treated conductor was tested by MS 202F-208.

In Example 16, a surface active agent was applied to the wire as the wire was fed to an extrusion apparatus in which an insulating jacket of ethylene/tetrafluoroethylene copolymer was melt-extruded over the wire. The wire was passed through a container in which a solution of the surface active agent (5% by weight in a mineral oil solvent as in Examples 4-9) was poured over the conductor, and excess solution was wiped off the wire by means of a sponge at the exit from the container. The insulated wire was stripped of its insulation and then tested by MS 202F-208.

TABLE

| Ex. No. | Solvent | Surface-active Agent Name | HLB No. | % Coverage after Steam Aging for | | |
|---|---|---|---|---|---|---|
| | | | | 8 Hrs | 16 Hrs | 24 Hrs |
| 1. | None | None | — | 87 | 53 | 52 |
| 2. | Oil | None | — | 85 | 57 | 50 |
| 3. | Freon | None | — | 70 | 65 | 50 |
| 4. | Oil | Span 85 | 1.8 | 99 | 97 | 88 |
| 5. | Oil | Emsorb 2503 | 2.1 | 98 | 98 | 78 |
| 6. | Oil | Emsorb 2500 | 4.6 | 97 | 95 | 75 |
| 7. | Oil | Emsorb 2515 | 8.0 | 95 | 92 | 47 |
| 8. | Oil | Igepal 530 | 10.8 | 72 | 33 | 33 |
| 9. | Oil | Tween 80 | 15.0 | 57 | 43 | 40 |
| 10. | Freon | Span 85 | 1.8 | 96 | 87 | 57 |
| 11. | Freon | Emsorb 2503 | 2.1 | 98 | 87 | 50 |

TABLE-continued

| Ex. No. | Solvent | Surface-active Agent Name | HLB No. | % Coverage after Steam Aging for 8 Hrs | 16 Hrs | 24 Hrs |
|---|---|---|---|---|---|---|
| 12. | Freon | Emsorb 2500 | 4.6 | 95 | 92 | 50 |
| 13. | Freon | Emsorb 2515 | 8.0 | 90 | 53 | 43 |
| 14. | Freon | Igepal 530 | 10.8 | 72 | 42 | 23 |
| 15. | Freon | Tween 80 | 15.0 | 87 | 55 | 53 |
| 16. | Oil | 3% Sarcosyl O | <2.0 | 98 | 98 | 70 |
|  |  | 2% Ten Cem | <2.0 |  |  |  |

Notes
Span 85 is sorbitan trioleate
Emsorb 2503 is sorbitan trioleate
Emsorb 2500 is sorbitan monooleate
Emsorb 2515 is sorbitan monolaurate
Igepal 530 is nonylphenoxypoly(ethyleneoxy) ethanol
Tween 80 is polyoxyethylene sorbitan monooleate
Sarcosyl O is oleoyl sarcosine
Ten Cem is zinc neodecanoate

We claim:

1. A method of making an insulated metal wire having improved retention of solderability on storage, which method comprises
   (1) applying a solution of a surface active agent in a liquid carrier to the surface of the wire; and
   (2) after step (1), surrounding the wire with a layer of a polymeric insulating composition, the layer being formed by melt extrusion of a polymeric insulating composition around and against the surface of the wire carrying the surface active agent or by wrapping a tape of a polymeric insulating composition around and against the surface of the wire carrying the surface active agent;
the surface active agent and the conditions of the method being such that the insulated wire has improved retention of solderability on storage.

2. A method according to claim 1 wherein the insulated wire passes Military Standard 202 Method 208 after 8 hours of steam-aging.

3. A method according to claim 1 wherein the surface active agent has an HLB number of less than 10.

4. A method according to claim 1 wherein the surface active agent has an HLB number of less than 5.

5. A method according to claim 1 wherein the surface active agent has an HLB number of less than 3.

6. A method according to claim 1 wherein the wire is a tin-coated copper wire.

7. A method according to claim 6 wherein step (2) comprises melt-extruding the insulating composition around the wire.

8. A method according to claim 7 wherein step (2) comprises melt-extruding polyethylene around the wire.

9. A method according to claim 8 wherein step (2) comprises melt-extruding an ethylene/tetrafluoroethylene copolymer around the wire.

10. A method according to claim 6 wherein the wire has a size of 10 to 26 AWG.

11. A method according to claim 6 wherein the wire is a stranded wire and the tin coating on the wire has a nominal thickness of 35 to 45 microinches.

12. A method according to claim 6 wherein the wire is a stranded wire and the tin coating on the wire has a nominal thickness of 15 to 35 microinches.

13. A method according to claim 6 wherein the polymeric insulating composition, at the time it is applied, does not contain any of the surface active agent applied in step (1).

14. A method according to claim 1 wherein the wire comprises a core of copper or a copper alloy and a coating on the core which is composed of one or more metals other than copper.

15. A method according to claim 1 wherein the wire comprises a core of steel and a coating on the core of copper or a copper alloy.

16. A method of making an insulated metal wire having improved retention of solderability on storage, which method comprises
   (1) coating the entire surface of a tin-coated copper stranded wire with a composition comprising a surface active agent having an HLB number less than 5; and
   (2) after step (1), melt-extruding around the wire coated with the surface active agent a layer of a polymeric insulating composition.

17. A method according to claim 14 wherein the insulating composition comprises an ethylene/tetrafluoroethylene copolymer.

* * * * *